United States Patent
Ikeda et al.

(10) Patent No.: US 7,060,146 B2
(45) Date of Patent: Jun. 13, 2006

(54) METHOD OF MANUFACTURING PNEUMATIC TIRE

(75) Inventors: Ikuji Ikeda, Kobe (JP); Yoshikazu Tanaka, Kobe (JP); Naohiko Kikuchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 34 days.

(21) Appl. No.: 09/984,379

(22) Filed: Oct. 30, 2001

(65) Prior Publication Data

US 2002/0074077 A1    Jun. 20, 2002

(30) Foreign Application Priority Data

Oct. 30, 2000 (JP) .............. 2000-330854
Nov. 28, 2000 (JP) .............. 2000-361453

(51) Int. Cl.
  *B29D 30/30*    (2006.01)
  *B60C 13/00*    (2006.01)
(52) U.S. Cl. ............... 156/130.7; 152/458; 152/510; 152/525; 152/532; 156/117; 156/123
(58) Field of Classification Search ........... 156/117, 156/130, 130.7, 123, 133, 397; 152/510, 152/458, 524, 525, 532, 549, 555
See application file for complete search history.

(56) References Cited

U.S. PATENT DOCUMENTS

| 3,904,463 A | 9/1975 | Boileau |
| 4,067,372 A | 1/1978 | Masson |
| 6,209,603 B1 * | 4/2001 | Kanenari et al. ........... 152/458 |
| 6,360,799 B1 * | 3/2002 | Iwasaki .................. 152/555 |
| 6,415,840 B1 * | 7/2002 | Nishikawa et al. ......... 152/458 |

FOREIGN PATENT DOCUMENTS

| DE | 198 31 747 A1 | 1/2000 |
| EP | 0 537 780 A2 | 4/1993 |
| EP | 854 054 A1 | 7/1998 |
| EP | 1033218 A2 * | 9/2000 |
| GB | 802 898 | 10/1958 |
| GB | 1 048 241 | 11/1966 |
| JP | 08-238910 A * | 9/1996 |
| JP | 10-109506 A * | 4/1998 |
| JP | 2001 347812 | 12/2001 |

* cited by examiner

*Primary Examiner*—Geoffrey L. Knable
(74) *Attorney, Agent, or Firm*—Birch, Stewart, Kolasch & Birch, LLP

(57) ABSTRACT

A method of manufacturing a pneumatic tire comprises assembling unvulcanized rubber components to make a green tire, vulcanizing the green tire, and winding an unvulcanized rubber tape so that the windings collectively have a predetermined cross sectional shape for at least one of the unvulcanized rubber components to thereby make said at least one of the unvulcanized rubber components.

12 Claims, 11 Drawing Sheets

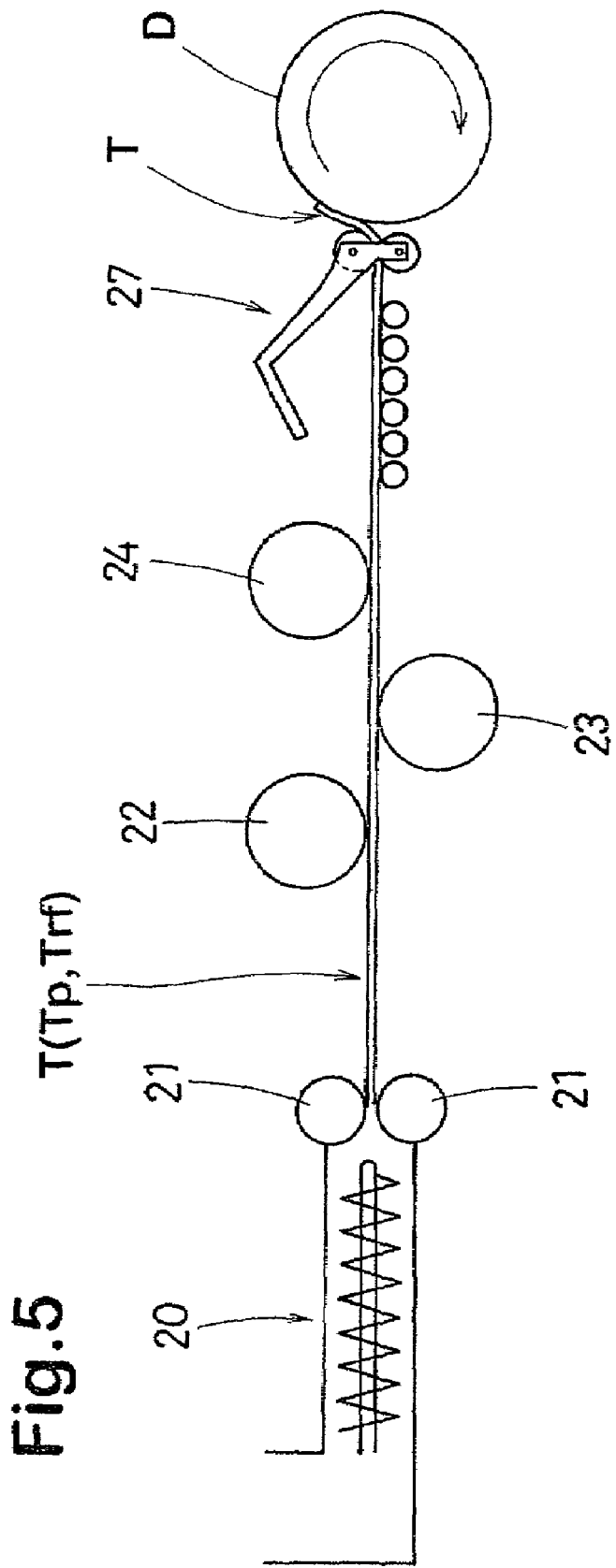

US 7,060,146 B2

METHOD OF MANUFACTURING PNEUMATIC TIRE

BACKGROUND OF THE INVENTION

1. Field of the Invention

The present invention relates to a method of manufacturing a pneumatic tire whose rubber components are formed by winding a unvulcanized rubber tape.

2. Description of the Related Art

Conventionally, unvulcanized rubber tires are made of unvulcanized rubber components having various shapes and sizes. As the unvulcanized rubber components are formed by extruders, the number and sizes of the extruders are depend on the maximum size and the number of the kinds of the rubber components. Usually, at least several extruders which are relatively large-sized are required.

In recent years, in order to decrease the number and size of extruders to decrease the plant size and to establish a flexible manufacturing system, it was proposed to make a pneumatic tire by winding an unvulcanized rubber tape around a drum directly or indirectly thereon instead of applying a rubber component. In this method, as shown in FIG. 11, an unvulcanized rubber tape T is wound into a target cross sectional shape similar to the final shape of the rubber component by controlling the overlaps of the windings of the tape.

Therefore, it became possible to make rubber components having various shapes and sizes.

In general, different rubber components of a tire are usually made of different rubber compounds. If the method of making a rubber component is simply changed from the extruding into a final shape to the winding into a final shape, it is still necessary to prepare various unvulcanized rubber tapes made of different rubber compounds.

SUMMARY OF THE INVENTION

A primary object of the present invention is to provide a method of manufacturing a pneumatic tire, by which it is possible to establish a flexible manufacturing system and to decrease the plant size, whereas another object of the present invention is to increase the number of rubber components which are made by winding an unvulcanized rubber tape. Still another object of the present invention is to decrease the number of unvulcanized rubber tapes used in a tire.

According to the present invention, a method of manufacturing a pneumatic tire comprises assembling unvulcanized rubber components to make a green tire, vulcanizing the green tire, and winding an unvulcanized rubber tape so that the windings collectively have a predetermined cross sectional shape for at least one of the unvulcanized rubber components to thereby make said at least one of the unvulcanized rubber components.

BRIEF DESCRIPTION OF THE DRAWINGS

Embodiments of the present invention will now be described in detail in conjunction with the accompanying drawings.

FIG. 5 is a diagram for explaining an apparatus for making and winding a rubber tape.

DETAILED DESCRIPTION

Figure 1A:
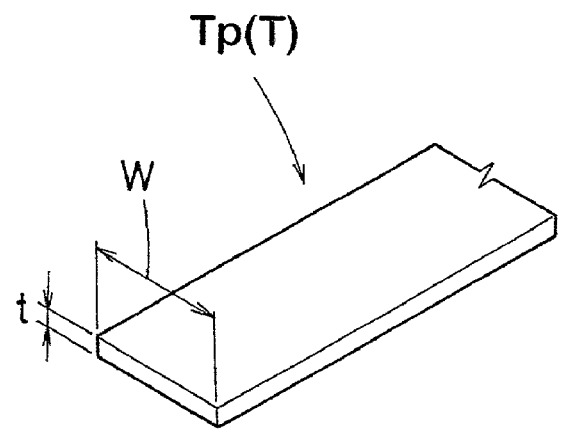
FIGS. 1a, 1b and 1c show unvulcanized rubber tapes for making rubber components.
Figure 1B:
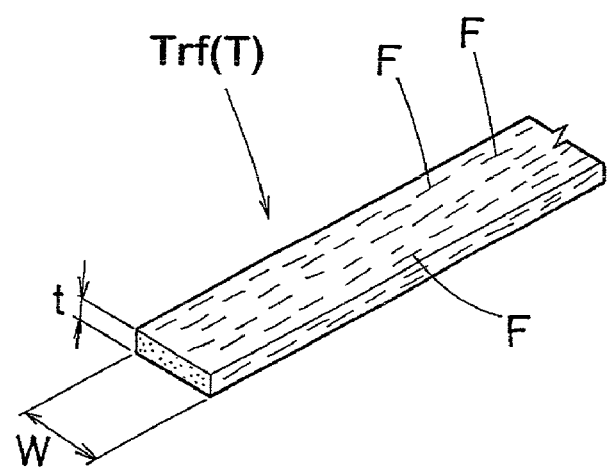
Figure 1C:
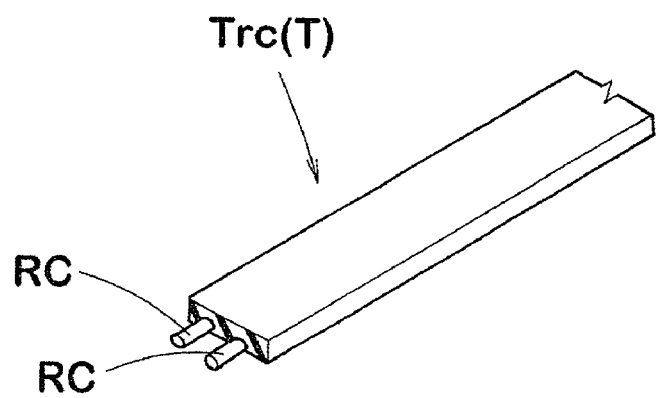

According to the present invention, tire components are formed by winding a long unvulcanized rubber tape T. The unvulcanized rubber tape T means a pure rubber tape Tp made of unvulcanized rubber only, a fiber containing rubber tape Trf made of unvulcanized rubber with short fibers mixed therein, and a cord containing rubber tape Trc made of unvulcanized rubber in which one or more cords are embedded along the length of the tape. FIGS. 1a, 1b and 1c show examples of the pure rubber tape Tp, fiber containing rubber tape Trf and cord containing rubber tape Trc, respectively. The thickness (T) of the unvulcanized rubber tape T may be set in a range of from 0.3 to 2.5 mm, preferably in a range of from 0.5 to 2.0 mm. The width W of the unvulcanized rubber tape T may be set in a range of from 5 to 50 mm preferably in a range of from 10 to 25 mm.

The present invention can be applied to various pneumatic tires, e.g. passenger car tires, light truck tires, motorcycle tires, heavy duty tires and the like. However, for the sake of convenience, the following descriptions are made based on passenger car radial tires having a low aspect ratio.

In the drawings, pneumatic tire 1 comprises a tread portion 2, a pair of sidewall portions 3, a pair of bead portions 4 each with a bead core 5 therein, a carcass 6 extending between the bead portions 4, and a tread reinforcing belt disposed radially outside the carcass 6 in the tread portion 2.

The carcass 6 comprises at least one ply 6A of cords arranged radially at an angle of from 75 to 90 degrees with respect to the tire equator C, extending between the bead portions 4 through the tread portion 2 and sidewall portions 3, and turned up around the bead core 5 in each bead portion 4 from the inside to the outside of the tire so as to form a pair of turnups 6b and the main 6a therebetween. For the carcass cords, organic fiber cords, e.g. polyester, nylon, rayon, aramid and the like or steel cords are used. The exemplary carcass 6 shown in the drawings is composed of a single ply 6A of organic fiber cords arranged radially at 90 degrees, and the carcass ply turnups 6b extend radially outwardly beyond the maximum section width point of the carcass main 6b.

The tread reinforcing belt comprises a breaker 7 and a optional band disposed on the radially outside of the breaker 7.

The breaker 7 is disposed on the crown portion of the carcass 6 and comprises at least two cross plies 7A and 7B of cords laid parallel with each other at an angle of from 10 to 45 degrees with respect to the tire equator. For the breaker cords, steel cords and high-modulus organic cords such as aramid fiber cords can be used.

The band is disposed on the radially outside of the breaker 7 and made of cord(s) laid at almost zero angle or a small angle with respect to the circumferential direction of the tire.

Preferably, the band is formed by spirally winding at least one organic fiber cord, e.g. nylon and the like, at an angle of not more than 5 degrees with respect to the tire equator. In case that a plurality of band cords are spirally wound, a rubber tape Trc in which band cords are embedded along the length thereof as shown in FIG. 1c, is preferably used.

The exemplary belt shown in the drawings is composed of a breaker 7 made up of two cross plies of steel cords.

A pneumatic tire is compose of various rubber components. In the tread portion 2, a tread rubber Gt is disposed radially outside the belt. In each of the sidewall portions 3, a sidewall rubber Gs is disposed axially outside the carcass 6 defining a part of the outer surface of the tire. In each of the bead portions 4, a clinch rubber Gbc is disposed along the axially outer surface and bottom surface of the bead portion, and a bead apex rubber Gba is further disposed on the radially outside of the bead core 5 and extends radially outwardly therefrom while tapering towards its radially outer end. On the inside of the carcass 6, an inner liner rubber Gil made of an air-impermeable rubber compound may disposed to cover the inner surface of the tire air-tightly. In the exemplary tires shown in the drawings, the bead apex rubber Gba is made of a hard rubber compound and disposed between the carcass main 6a and turnup 6b and terminates on the radially inside of the radially outer end of the turnup 6b.

In the following examples tires, at least the sidewall rubber Gs is formed by winding a long unvulcanized rubber tape T.

Figure 2:
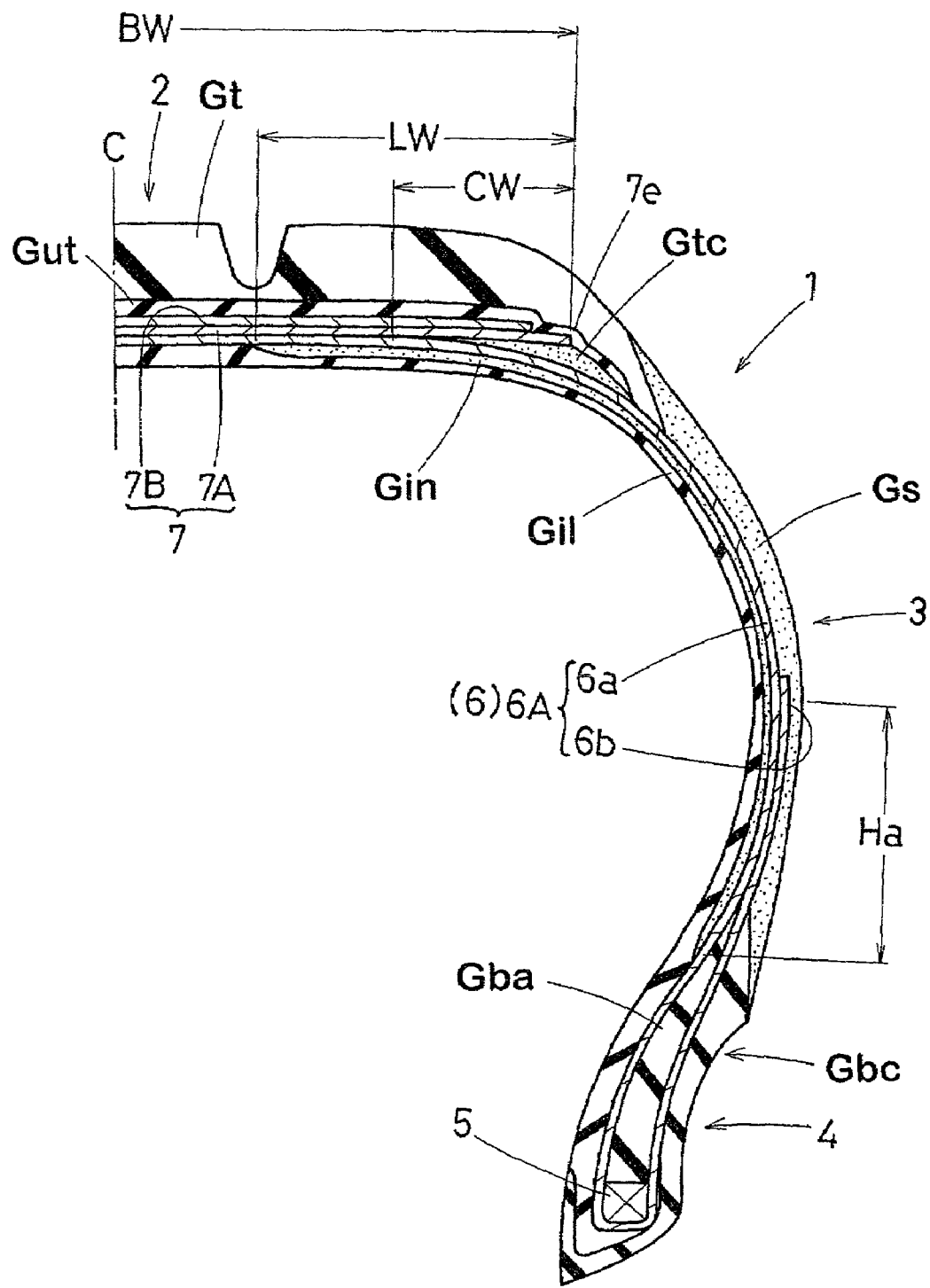
FIG. 2 is a cross sectional view of a pneumatic tire.

FIG. 2 shows a radial tire for passenger cars in its normally inflated unloaded state.

Here, the normally inflated unloaded state is such that the tire is mounted on a standard wheel rim and inflated to a standard inner pressure but loaded with no tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. Incidentally, the standard load is the "maximum load capacity" in JATMA, the "Load Capacity" in ETRTO, the maximum value given in the above-mentioned table in TRA or the like.

In this example, in addition to the above-mentioned rubber components, a thin under tread rubber Gut is disposed between the belt 7 and the tread rubber Gt to improve the adhesion between the belt 7 and the tread rubber Gt.

Further, a cushion rubber Gtc is disposed between the axially outer edges 7e of the belt 7 and the carcass 6 in order to mitigate stress on the belt edge. Preferably, the axial overlap width CW of the cushion rubber Gtc and the belt 7 is set in a range of from 0.05 to 0.25 times preferably 0.07 to 0.2 times the axial width BW of the belt 7. The cushion rubber Gtc tapers from its middle point towards each side thereof.

Furthermore, each of the sidewall portiens portions 3 is provided between the carcass 6 and the inner liner rubber Gil with an insulation rubber Gin to prevent a separation of the inner liner rubber Gil from the carcass 6. The insulation rubber Gin extends at least between a position near the axially outer end of the belt 7 and a position radially inwards of the maximum section width point of the carcass main 6a. Preferably, the insulation rubber Gin overlaps with the belt 7 by an axial width LW in a range of from 0.2 to 0.5 times preferably 0.2 to 0.4 times the axial width BW of the belt 7.

On the other hand, the radially inner end of the insulation rubber Gin is spaced radially inwardly from the maximum section width point of the carcass main by a radial distance Ha in a range of not less than 0.1 times preferably 0.3 to 0.4 times the tire section height. In this example, the radially inner end of the insulation rubber Gin is positioned radially inside the radially outer end of the bead apex rubber Gba.

The above-mentioned clinch rubber Gbc comprises a base part extending along the bottom face of the bead portion 4, and an axially outer part and an axially inner part extending along the axially outer surface and axially inner surface of the bead portion 4, respectively.

The above-mentioned sidewall rubber Gs is spliced with the tread rubber Gt and the axially outer part of the clinch rubber Gbc.

It is desirable for decreasing the number of different kinds of unvulcanized rubber tapes T, that a plurality of rubber components should be formed by winding an unvulcanized rubber tape T. This means that these rubber components are made of an identical rubber compound. It is however, not always necessary that the rubber tape T has a constant thickness and a constant width because the thickness and/or width can be changed during winding by means of rolling and the like. Further, it is not always necessary that the rubber tape T is continuous between the rubber components. The rubber tape T may be cut if need be. The important thing is to use a rubber tape formed by one apparatus which may include an extruder and rollers.

In this embodiment, the sidewall rubber Gs, insulation rubber Gin and cushion rubber Gtc are formed by winding a pure rubber tape Tp1, namely, these are made of the identical rubber compound.

The clinch rubber Gbc is formed by winding a pure rubber tape Tp2 made of a different rubber compound.

The inner liner rubber Gil is formed by winding a pure rubber tape Tp3 made of a different air-impermeable rubber compound.

As the inner liner rubber Gil is used to provide the tire inner surface with air-tightness, a butyl-base rubber compound is used for the unvulcanized rubber tape Tp3, which includes at least 50 parts by weight of butyl rubber or a derivative thereof with respect to 100 parts by weight of the base rubber. For the deliberative of butyl rubber, halogenated butyl rubber such as chlorinated butyl rubber, brominated butyl rubber and the like is used.

As the sidewall rubber Gs, cushion rubber Gtc and insulation rubber Gin are disposed in regions where deformation is relatively large, the rubber components are subjected to mechanical fatigue. Accordingly, it is very important to prevent separation failure between the windings of the rubber tape Tp1 and cracks on the tire outer surface along the boundaries therebetween. The sidewall rubber Gs should be superior in the cut resistance, weatherproof, flexibility and the like.

On the other hand, the clinch rubber Gbc is pressed and rubs against the wheel rim and it is necessary to provide the bead portion with rigidity.

Therefore, a rubber compound which is relatively hard and superior in the resistance to abrasion is used for the unvulcanized rubber tape Tp2 forming the clinch rubber Gbc.

For the unvulcanized rubber tape Tp1, however, a non-butyl-based rubber compound superior in adhesion and elasticity is used, which includes 40 to 100 parts by weight of a low viscosity polybutadiene rubber and at least 2.5, preferably at least 2.7, more preferably 3.0 to 4.0 parts by weight of age resistor with respect to 100 parts by weight of the rubber component thereof. The Mooney viscosity of the low viscosity polybutadiene rubber is set in a range of not more than 40, preferably from 28 to 38, more preferably 25. to 35 {ML(1+4) @100 deg. C.}.

For the age resistor, for example,
N-phenyl-N'-isopropyl-p-phenylenediamine,
N-(1,3-dimethylbutyl)-N'phenyl-p-phenylenediamine,
diallyl-p-phenylenediamine mixture,
N,N'-diphenyl-p-phenylenediamine,
p-(p-toluenesulphenylamino)diphenylamine,
octylatediphenylamine,
polymer of 2,2,4-trimethyl-1,2-dihydroquinoline,
6-ethoxy-2,2,4-trimethyl-1,2-dihydroquinoline,
N-phenyl-1-naphthylamine,
4,4'-(alpha,alpha-dimethylbenzyl)dithiocarbamate,
N,N'-di-2-naphthyl-p-phenylenediamine,
nickel-dimethyldithiocarbamate,
nickel-dibutyldithiocarbamate,
2-mercaptobenzimidazole,
zinc salt of 2-mercaptobenzimidazole,
2-mercaptomethylbenzimidazole,
zinc salt of 2-mercaptomethylbenzimidazole,
1,3-bis(dimethylaminopropyl)-2-tiourea,
tributyltiourea,
N-phenyl-N'-(3-methacryloyloxy-2-hydroxypropyl)-p-phenylenediamine and the like may be used.

The sidewall rubber Gs, cushion rubber Gtc and insulation rubber Gin, namely, the rubber tape Tp1 when vulcanized have a 100% modulus of from 0.5 to 2.5 MPa preferably 0.5 to 2.0 MPa more preferably 0.7 to 2.0 MPa, and a JIS type-A-durometer hardness of not more than 65 degrees preferably 40 to 65 degrees more preferably 50 to 62 degrees.

If the 100% modulus is less than 0.5 MPa, the rigidity becomes insufficient for the sidewall portion 3 and it is difficult to maintain the steering stability. If the 100% modulus is more than 2.5 MPa and/or the JIS type-A-durometer hardness is more than 65 degrees, then it is difficult for the cushion rubber Gtc to mitigate the stress on the belt edge, and it is difficult to provide necessary elasticity for the sidewall rubber Gs.

The following table shows an example of the rubber compound of the rubber tape Tp1.

|  | (parts by weight) |
|---|---|
| Natural rubber | 40 |
| Low viscosity polybutadiene rubber | 60 |
| FEF | 50 |
| Aromatic oil | 5 |
| Age resistor | 3 |
| Wax | 1.5 |
| Stearic acid | 2.5 |
| Zinc oxide | 3.0 |
| Vulcanization accelerator | 1.0 |
| Sulfur | 1.5 |
| JIS type-A-durometer hardness | 55 *3 |
| 100% modulus | 1.1 *3 MPa |

*1 Mooney viscosity: 30{ML(1 + 4) @ 100 deg. C.}
*2 N-(1,3-dimethylbutyl)-N'phenyl-p-phenylenediamine
*3 vulcanizing conditions: 160 deg. C., 18 minutes The above-mentioned JIS type-A-durometer hardness is measured according to the Japanese Industrial Standard K6253. The Mooney viscosity is measured according to the Japanese Industrial Standard K6300.

The above-mentioned pneumatic tire 1 can be made as shown in FIGS. 3a to 3g.

Figure 3A:
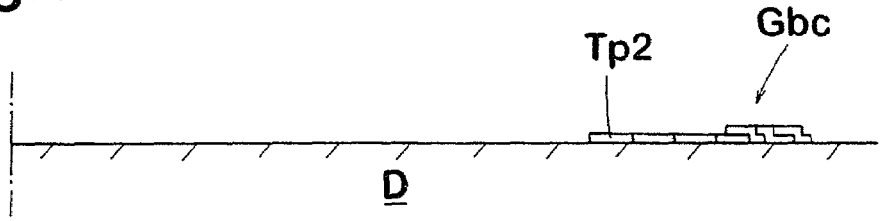
FIGS. 3a–3g are diagrams for explaining a method of manufacturing a pneumatic tire according to the present invention.

First, as shown in FIG. 3a, the above-mentioned tape Tp2 is wound on a cylindrical tire building drum D to make the clinch rubber Gbc on each side of the drum center while leaving a space therebetween.

Figure 3B:
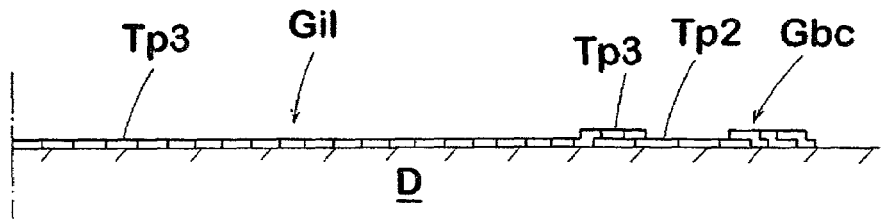

Further, in order to make the inner liner rubber Gil, as shown in FIG. 3b, the tape Tp3 is wound on the cylindrical tire building drum D across the space between the windings of the tape Tp2. The inner liner rubber Gil is somewhat overlapped with the clinch rubber Gbc.

Figure 3C:
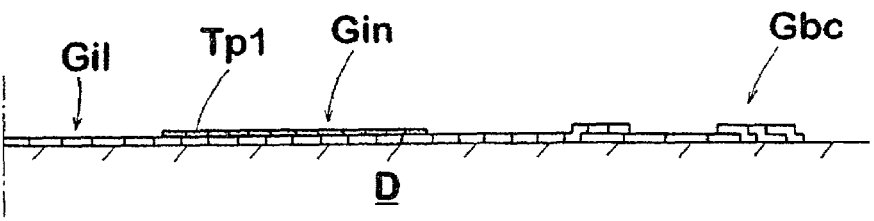

Next, as shown in FIG. 3c, in order to make the insulation rubber Gin, the tape Tp1 is wound on the inner liner rubber Gil.

Figure 3D:
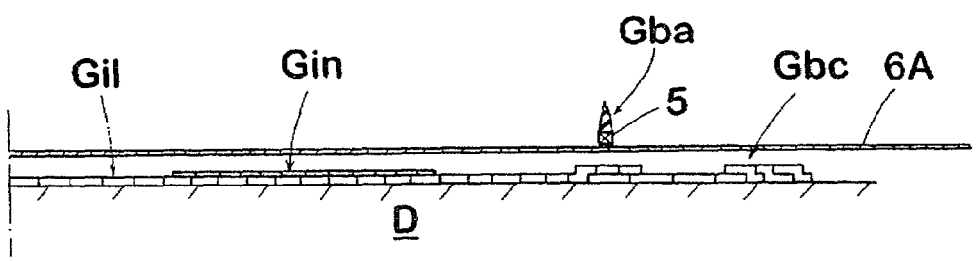

Then, as shown in FIG. 3d, in order to make the carcass ply 6A, a wide raw strip of rubberized carcass cords is applied thereon. Further, the bead core 5 and raw bead apex rubber Gba are placed in each of the corresponding positions on the wound carcass strip.

Figure 3E:
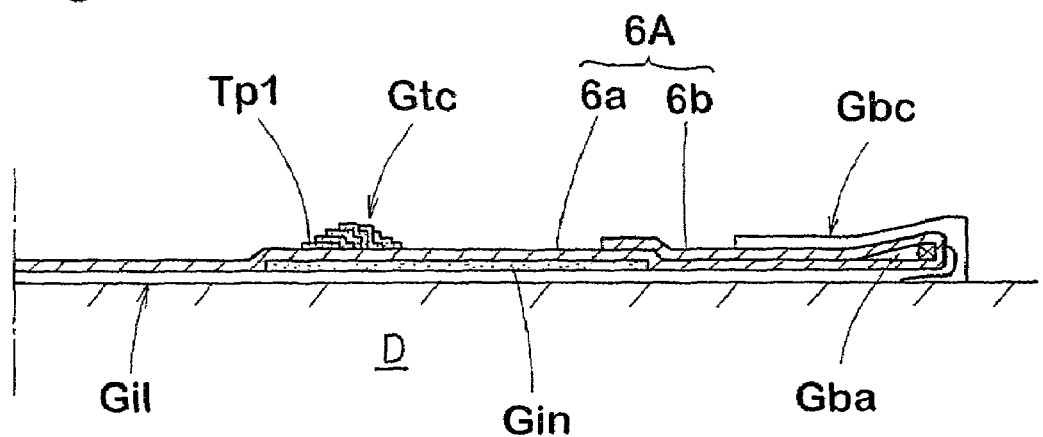

Further, as shown in FIG. 3e, the edges of the carcass strip 6A are folded around the respective bead cores 5 together with the greater part of the clinch rubber Gbc.

In order to make the cushion rubber Gtc in the corresponding positions to the belt edges, the rubber tape Tp1 is wound on the carcass strip into a substantially triangular sectional shape. Thus the rubber tape Tp1 is used again.

Figure 3F:
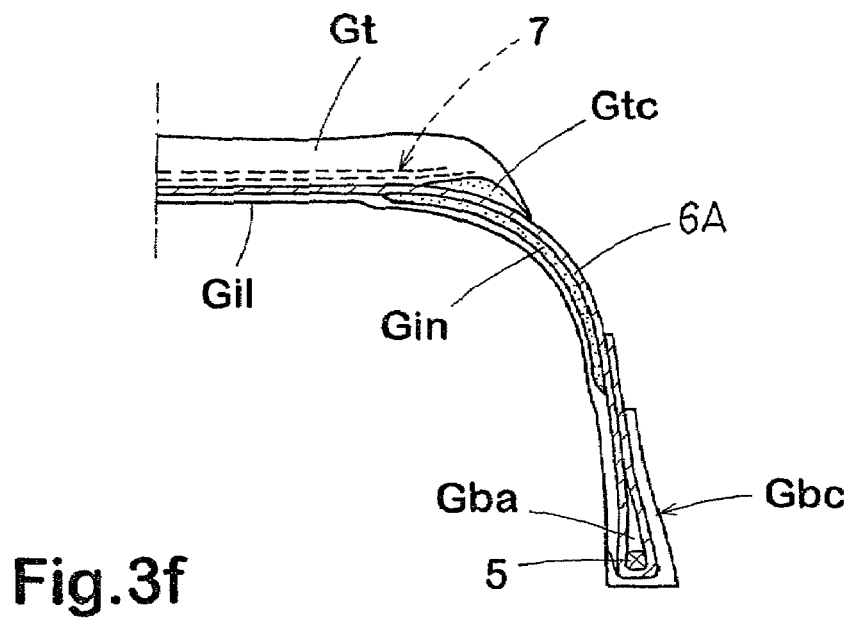

The above-mentioned raw carcass strip 6A and the rubber components wound directly or indirectly on the cylindrical drum D are changed into a toroidal shape as shown in FIG. 3f, while decreasing the distance between the bead cores 5. And on the crown portion of the toroidal shaped carcass, an assembly of the tread rubber Gt and belt 7 is set.

Figure 3G:
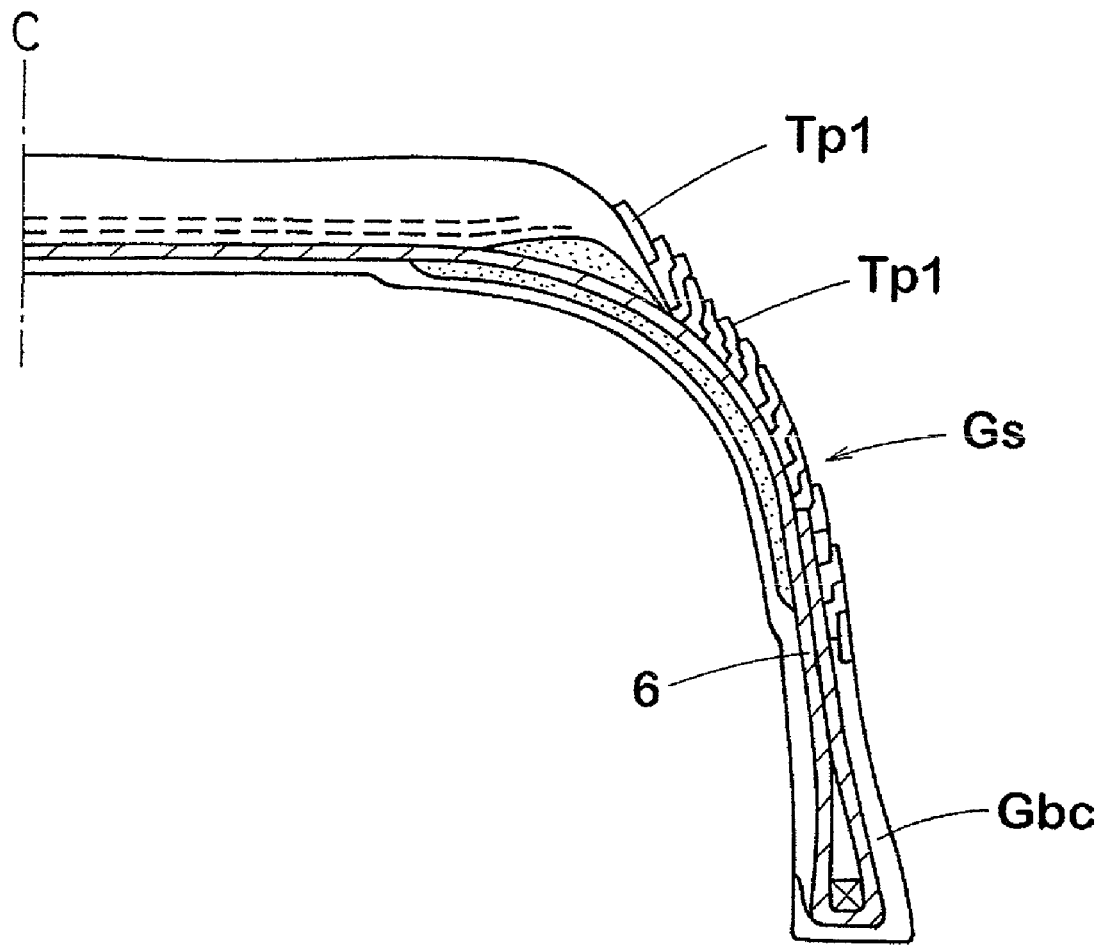

Further, as shown in FIG. 3g, in order to make the sidewall rubber Gs in each of the sidewall portions, the rubber tape Tp1 is wound on the axially outer face of the carcass 6. The rubber tape Tp1 is used one again.

Thus, a green tire is made. The green tire is put in a mold and vulcanized.

The above-mentioned tread rubber and belt assembly may be made as follows. A raw strip of rubberized breaker cords is applied to or wound on a profiled belt drum to make the breaker 7. In case the belt includes a band, a rubber tape Trc in which one or more band cords are embedded along the length thereof is spirally wound. Then, an unvulcanized rubber tape T is wound on the belt to make the under tread rubber Gtu (not shown), and another unvulcanized rubber tape T is wound thereon to make the tread rubber Gt.

For the unvulcanized rubber tape T of the under tread rubber Gut, a natural-rubber-base rubber compound superior in adhesion is used. For the unvulcanized rubber tape T (Tp or Trf) of the tread rubber Gt, a rubber compound superior in the wear resistance, heat generation and grip performance is used.

Figure 4A:
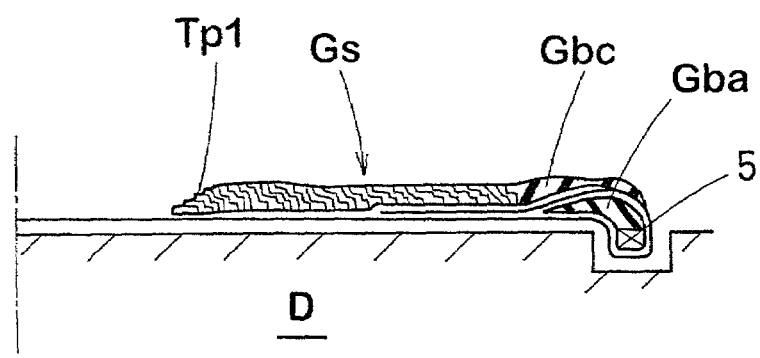
FIGS. 4a–4c are diagrams for explaining a modification of the method.
Figure 4B:
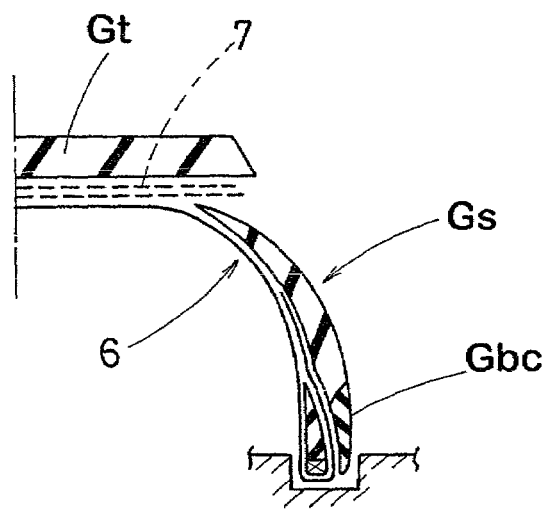

The sidewall rubber Gs can be made by winding an unvulcanized rubber tape T on the toroidal-shaped carcass as illustrated above. But, as shown in FIGS. 4a and 4b, it is also possible to make the sidewall rubber Gs by winding an unvulcanized rubber tape T on the carcass in a cylindrical shape, and thereafter the tape T is wound, the carcass, sidewall rubber, etc. are changed into a toroidal shape.

Figure 4C:
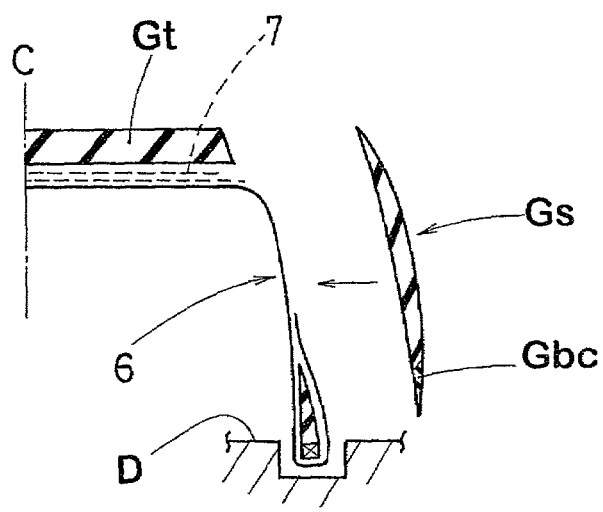

Further, as shown in FIG. 4c, it is possible to form the sidewall rubber Gs on another drum by winding an unvulcanized rubber tape T together with the clinch rubber Gbc, and then apply the assembly of the sidewall rubber Gs and clinch rubber Gbc to the toroidal shaped carcass.

FIG. 5 schematically shows an apparatus for making and winding an unvulcanized rubber tape T, which comprises an extruder 20 including a screw and a die, a pair of rollers 21 disposed near the outlet of the extruder's die to adjusting the thickness of the rubber tape T, a plurality of cooling rollers 22, 23 and 24 for cooling the extruded rubber tape T, a tape applicator 27 which can traverse the building drum D, and rollers for guiding and conveying the rubber tape to the applicator 27. The material rubber compound fed to the extruder is mixed by the screw and extruded from the die into a flat sectional shape. The extruded unvulcanized rubber is rolled by the rollers 21. By changing the gap between the rollers, the thickness of the rubber tape T is adjusted to the target thickness. The rubber tape T is fed to the applicator 27 through cooling rollers and guide rollers. The rubber tape T is wound on the building drum D by rotating the building drum D and traversing the tape applicator 27 to give a predetermined sectional shape to the windings. The extruding speed, rollers' gap, drum speed, applicator speed, applicator position and the like are controlled by a computer according to stored programs and outputs of various sensors for the tape thickness, various positions, various speeds, temperature, etc. If necessary, a tape accumulator may be provided between the extruder and applicator.

In the above-mentioned embodiment, as the specific rubber compound is used in the rubber tape Tp1, the sidewall rubber Gs, insulation rubber Gin and cushion rubber Gtc can be made by winding the same rubber tape Tp1 and the resultant tire can display its performance equal to a tire made by the conventional method.

It may be possible to improve a specific performance of the tire by using plural kinds of rubber compounds. However, it goes against an object of the present invention. A solution therefor is to use a fiber containing rubber tape Trf of which short fibers have a variable degree of orientation.

The fiber containing rubber tape Trf is made by extruding the fiber mixed rubber compound and rolling the extruded compound. The short fibers in the rubber tape Trf are oriented in the extruding direction or the longitudinal direction of the tape through these process. It is possible to control the degree of orientation by changing the thickness of the rubber tape Trf. The thinner rubber tape has a higher degree of orientation. Thus, the fiber containing rubber tape Trf having a variable degree of orientation includes a thin tape and a thick tape. The thin tape and thick tape may be discontinuous. But, in this example, these are continuous.

Preferably, non-metallic fibers are used for the short fibers F. For example, organic fibers, e.g. nylon, polyester, aramid, rayon, vinylon, cotton, cellulosic resin, crystalline polybutadiene and the like and inorganic fibers, e.g. glass fiber, carbon fiber, boron fiber and the like may be used alone or in combination as far as a sufficient adhesion to the rubber can be obtained. The average length of the short fibers F is set in a range of from 0.2 to 5 preferably 1.0 to 4.0 millimeters, and the average diameter thereof is in a range of from 10 to 100 preferably 50 to 80 micrometers. For example, nylon 66 fibers having an average length of 3.5 mm and an average diameter of 70 to 80 micrometers are used.

The content of the short fibers F is set in a range of from 10 to 30 preferably 15 to 25 parts by weight with respect to 100 parts by weight of the rubber component of the compound.

For the rubber component, there is used diene rubber such as natural rubber, isoprene rubber, styrene butadiene rubber, butadiene rubber, chloroprene rubber, acrylonitrile butadiene rubber and the like, alone or in combination.

Usually, the thickness (t) of the fiber containing rubber tape Trf is set in a range of from 0.3 to 2.5 mm preferably 0.5 to 2.0 mm as mentioned above. And the ratio (t1/t2) of the thickness t1 of the thin tape to the thickness t2 of the thick tape is set in a range of from 0.15 to 0.80 preferably 0.20 to 0.75 more preferably 0.20 to 0.70. The width W of the rubber tape Trf may be set in a range of from 5 to 50 mm preferably 10 to 25 mm.

Figure 6:
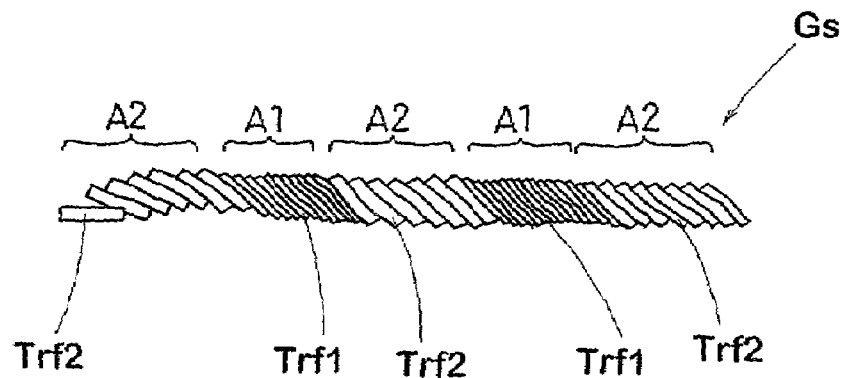
FIG. 6 shows a rubber component formed by winding an unvulcanized rubber tape including short fibers having a variable degree of orientation.

For example, in a rubber component shown in FIG. 6, part A1 is formed by winding a thin tape Trf1 and part A2 is formed by winding a thick tape Trf2. As a result, the part A1 may have a higher rigidity than the part A2.

Figure 7A:
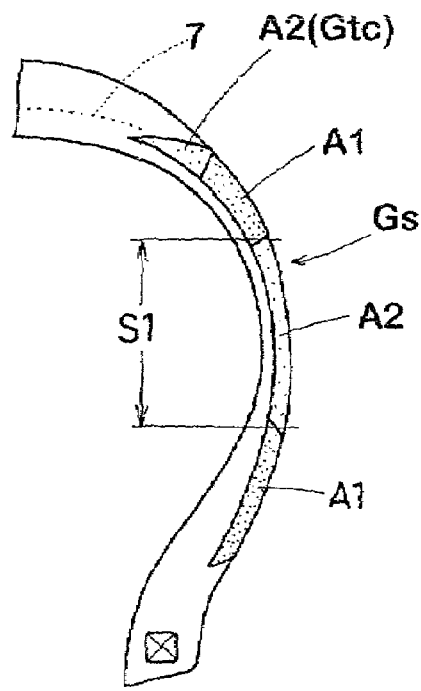
FIGS. 7a and 7b each show a sidewall rubber.
Figure 7B:
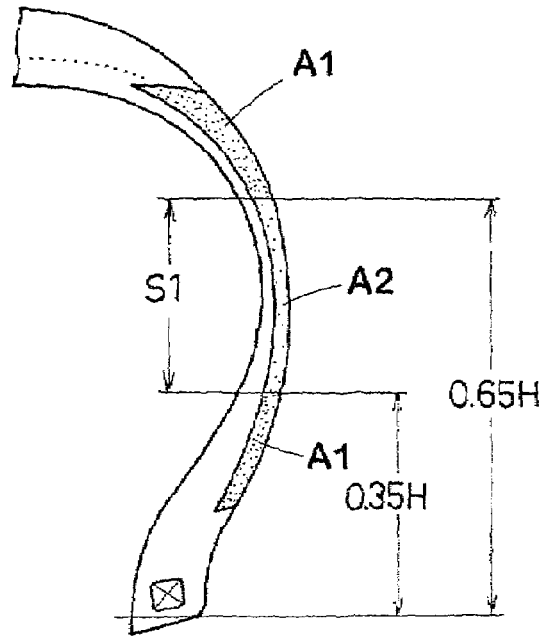

In FIGS. 7a and 7b, the sidewall rubber Gs is formed by winding the fiber containing unvulcanized rubber tape Trf. As the short fibers F in the rubber tape Trf are oriented almost parallel with the longitudinal direction of the tape, the short fibers F are oriented substantially in the tire circumferential direction.

A middle part of the sidewall rubber Gs where the bending deformation during running is largest, is formed by winding the thick tape so that the degree of orientation of the short fibers decreases. Accordingly, a less oriented middle part A2 is formed and a high oriented part A1 is provided on each side thereof. Such less oriented middle part A2 is preferably provided in a radial height range S1 between 65% and 35% of the tire section height H. Therefore, the ride comfort and rolling resistance may be improved. The degree of orientation can be changed stepwise as shown in FIG. 7a or gradually as shown in FIG. 7b. In FIG. 7a, a less oriented part A2 is further provided at the radially outer end of the sidewall rubber which is positioned under the belt edge 7e so as to function as the cushion rubber Gtc.

As to the difference of the actual direction of the fiber from the tire circumferential direction, it is preferable that at least about 90% of the short fibers are less than 30 degrees in order to derive a directional reinforcing effect from the oriented short fibers.

In this example, as the short fibers F in the sidewall rubber Gs are oriented substantially in the tire circumferential direction, the sidewall rubber Gs is effectively increased in the circumferential rigidity without excessively increasing the radial rigidity. As a result, the rolling resistance of the tire is reduced without deteriorating the ride comfort. Also the cut resistance is improved. Further, it becomes possible to reduce the tire weight because the thickness of the sidewall rubber may be decreased by the increased rigidity.

If the average fiber length is less than 0.2 mm and/or the average fiber diameter is less than 10 micrometers, it is difficult to obtain a sufficient directional reinforcing effect. If the average fiber length is more than 5 mm and/or the average fiber diameter is more than 100 micrometers, the adhesion to rubber tends to decrease and the wear resistance and crack resistance are liable to decrease.

If the content of the short fibers F is less than 10 parts by weight, the circumferential rigidity of the sidewall rubber 9 decreases. If the content of the short fibers F is more than 30 parts by weight, there is a tendency to decrease the crack resistance.

In the above-mentioned embodiment, the fiber containing rubber tape Trf is used to make the entirety of the sidewall rubber Gs which is disposed adjacently to the carcass. However, it is also possible to use the fiber containing rubber tape Trf to make a part of the sidewall rubber Gs. In this case, the remaining part may be formed by winding a pure rubber tape Tp. Further, it is also possible to use a rubber strip extruded in a final shape (not a rubber tape Tp wound into a final shape). Furthermore, a cord-reinforced rubber tape Trc may be used.

Incidentally, regardless of whether the degree of orientation is variable or constant, a fiber containing rubber tape Trf can be used in combination with a pure rubber tape Tp and/or a rubber strip to make a part or the entirety of a rubber component.

Figure 8:
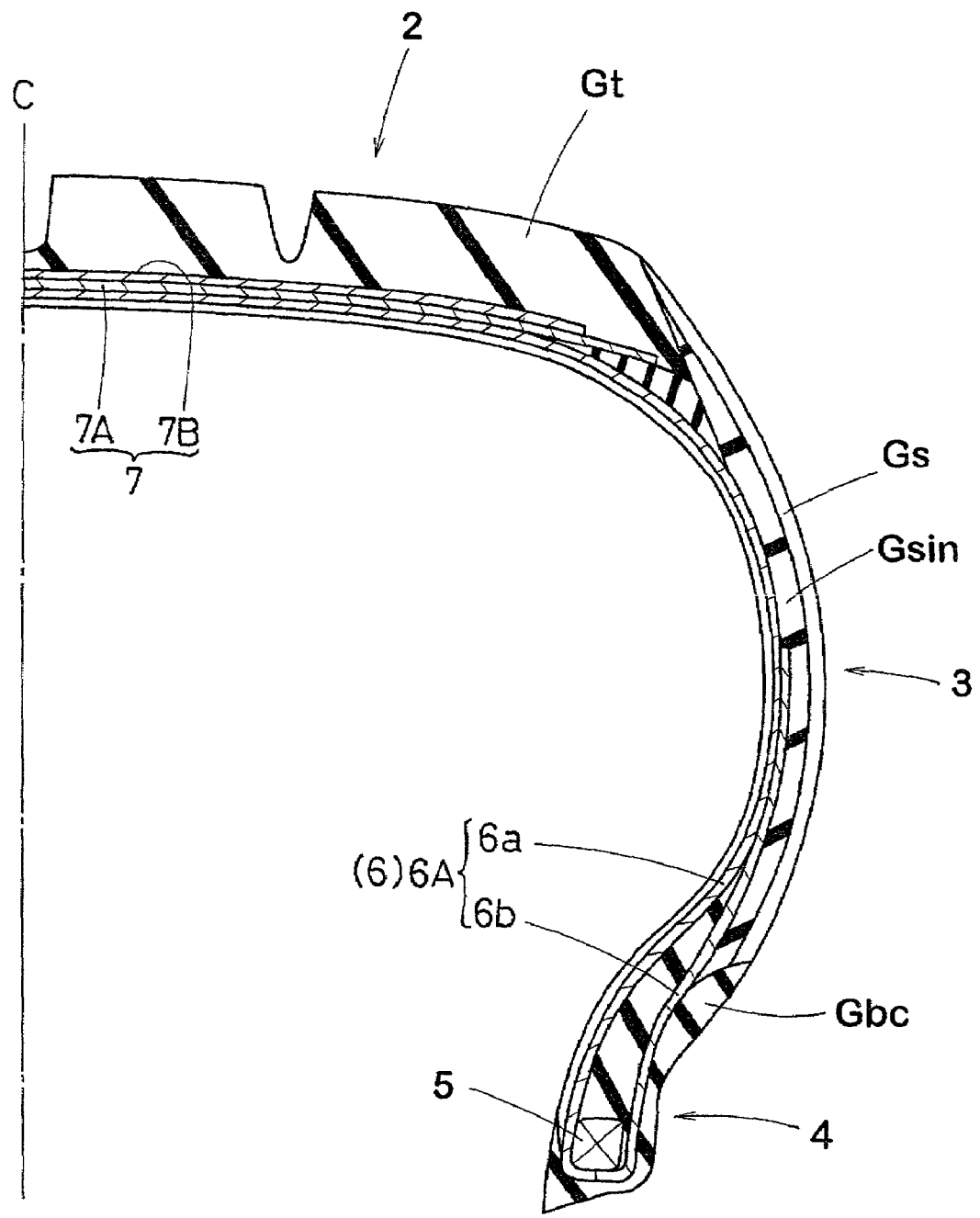
FIG. 8 is a cross sectional view of a pneumatic tire.

For example, as shown in FIG. 8 (this tire has an aspect ratio of not more than 55%), the sidewall portion 3 may have a double layered structure comprising a sidewall rubber Gs formed by winding a pure rubber tape Tp and an inner sidewall rubber Gsin formed by winding a fiber containing rubber tape Trf.

In this example, the pure rubber tape Tp is made of a relatively soft rubber compound so that the sidewall rubber Gs has a JIS type-A-durometer hardness of from 48 to 58 degrees preferably 50 to 56 degrees more preferably 52 to 54 degrees, and a modulus at a 230% elongation of from 1.5 to 2.5 MPa, and a Mooney viscosity of from 28 to 44 {ML(1+4)} preferably 34 to 38 {ML(1+4)} more preferably 32 to 40 {ML(1+4)}. In the case of a double layered structure, the sidewall rubber (axially outer layer) can have a 230% modulus of from 1.5 to 6.0 MPa. This soft rubber compound preferably includes, as its base rubber, diene rubber such as natural rubber, isoprene rubber, styrene butadiene rubber, butadiene rubber, chloroprene rubber, acrylonitrile butadiene rubber and the like, alone or in combination. The following table shows an example of the soft rubber compound

| Butadiene rubber | 55 PHR |
| Natural rubber | 35 PHR |
| Isoprene rubber | 10 PHR |
| FEF | 45 parts by weight |

As to the inner sidewall rubber Gsin, on the other hand, in order to effectively reinforce the sidewall portion, the short fibers should be oriented in a high degree such that at least about 90% of the short fibers are oriented at less than 30 degrees with respect to the tire circumferential direction. For example, aramid short fibers are used. Preferably, the rubber compound for the inner sidewall rubber has a JIS type-A-durometer hardness of from 60 to 95 degrees, a modulus at a 230% elongation of from 2.8 to 6.0 MPa, and a Mooney viscosity of from 40 to 73 {ML(1+4)}.

The thickness t2 of the sidewall rubber Gs is set in a range of more than 0.05 times and less than 4.0 times the thickness t1 of the inner sidewall rubber Gsin.

As the unvulcanized rubber tape Tp of the sidewall rubber Gs is made of the soft rubber compound, the adhesion between the windings of the rubber tape is improved. Thus the occurrence of cracks in the sidewall outer surface can be effectively prevented, though the windings are exposed. Further, as the inner sidewall rubber Gsin increases in the rigidity, the steering stability can be improved.

If the JIS type-A-durometer hardness of the soft rubber compound is less than 48 degrees, it becomes difficult to maintain a necessary bending rigidity of the sidewall portion 3 and the steering stability deteriorates. If the JIS type-A-durometer hardness is more than 58 degrees, cracks are liable to occur in the sidewall outer surface along the boundaries between the windings.

If the 230% modulus of the soft rubber material R1 is less than 1.5 MPa, it becomes difficult to improve the steering stability. If the 230% modulus is more than 2.5 MPa, cracks are liable to occur.

If the Mooney viscosity of the soft rubber material R1 is less than 28 {ML(1+4)}, it is difficult to give the predetermined shape to the windings of the rubber tape. If the Mooney viscosity is more than 44 {ML(1+4)}, the adhesion between the windings decreases and cracks are liable to occur.

Figure 9:
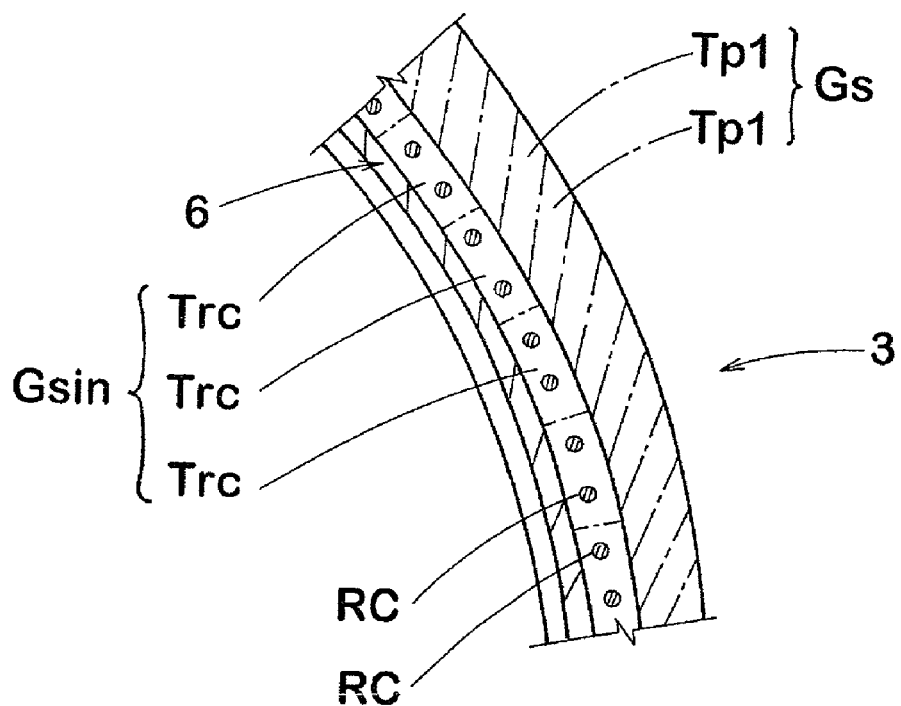
FIG. 9 is a partial sectional view of a sidewall portion.

FIG. 9 shows a modification of the above-mentioned double layered structure, wherein the sidewall rubber Gs may be the same as above, but the inner sidewall rubber Gsin is formed by winding a cord-reinforced rubber tape Trc shown in FIG. 1c. The cord-reinforced rubber tape Trc may be wound in an upper sidewall portion near the tire shoulder. In the remaining lower sidewall portion, the above-mentioned fiber containing rubber tape Trf or the under-mentioned pure rubber tape Tp4 may be wound. In this case, the steering stability may be further improved. For the reinforcing RC, organic cords, for example, 840d nylon cords are preferably used.

Figure 10:
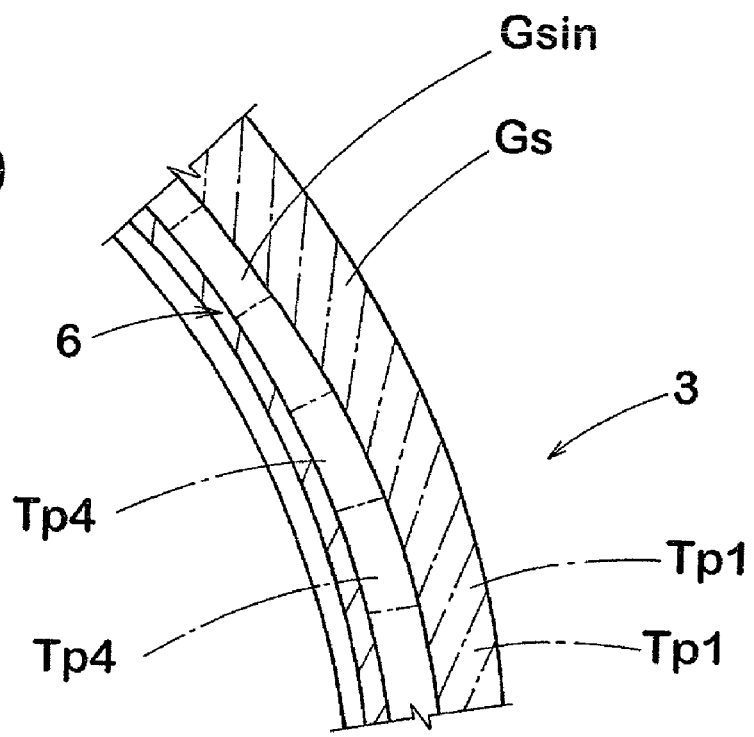
FIG. 10 is a partial sectional view of a sidewall portion.
Figure 11:
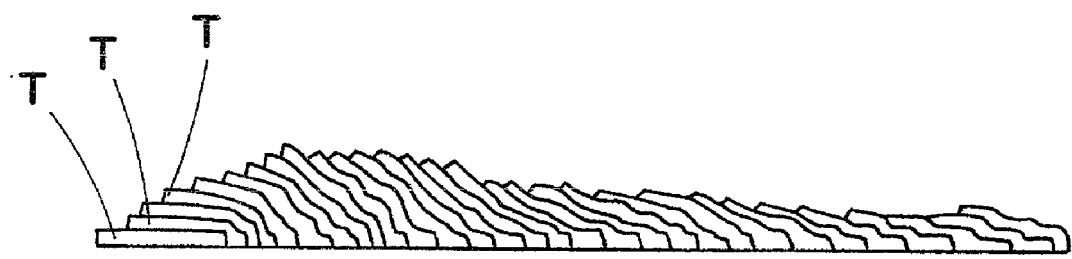
FIG. 11 is a sectional view of a unvulcanized rubber component formed by winding an unvulcanized rubber tape.

FIG. 10 further shows a modification of the double-layered structure shown in FIG. 9, wherein the sidewall rubber Gs is the same as above, but the inner sidewall rubber Gsin is formed by winding a pure rubber tape Tp4 which is made of a rubber compound harder than that of the sidewall rubber Gs for the purpose of increasing the rigidity of the sidewall portion 3. Furthermore, instead of winding the narrow pure rubber tape Tp4, the inner sidewall rubber Gsin may be formed by applying a relatively wide rubber strip which may be formed by means of an extruder. In the inner sidewall in this example, the JIS type-A-durometer hardness, 230% modulus and Mooney viscosity are set to be higher than the sidewall rubber Gs and near the respective upper limits, namely, 95 degrees, 6.0 MPa and 73 {ML(1+4)}.

The invention claimed is:

1. A method of manufacturing a pneumatic tire, comprising:

assembling tire components including a carcass and unvulcanized rubber components to make a green tire, the tire comprising the carcass extending between bead portions through a tread portion and sidewall portions, an axially outer sidewall rubber disposed in each said sidewall portion to define an outer surface of the sidewall portion, and an axially inner sidewall rubber disposed on the axially inside of said axially outer sidewall rubber, vulcanizing the green tire to form said pneumatic tire, wherein the method further comprises:

winding at least one unvulcanized fiber-reinforced rubber tape having short fibers mixed therein so that the windings collectively have a predetermined cross sectional shape of said axially inner sidewall rubber to thereby make the axially inner sidewall rubber, wherein the short fibers therein are oriented towards a tire circumferential direction, and a degree of orientation of the short fibers decreases at a middle of the sidewall portion, and winding an unvulcanized rubber tape so that the windings collectively have a predetermined cross sectional shape for at least one of the unvulcanized rubber components to thereby make said at least one of the unvulcanized rubber components, wherein said at least one of the unvulcanized rubber components is said axially outer sidewall rubber having a Mooney viscosity of from 28 to 44 {ML(1+4)}.

2. The method according to claim 1, wherein the tire further comprises a cushion rubber disposed between the carcass and an edge of a tread reinforcing belt, and said at least one of the unvulcanized rubber components formed by winding said unvulcanized rubber tape, further includes the cushion rubber.

3. The method according to claim 1, wherein the tire further comprises:

an inner liner rubber disposed inside a carcass along the inner surface of the tire; an insulation rubber disposed in a radially outer part of the sidewall portion between the carcass and the inner liner rubber; and a cushion rubber disposed between the carcass and an edge of a tread reinforcing belt, said at least one of the unvulcanized rubber components formed by winding said unvulcanized rubber tape, further includes the insulation rubber and the cushion rubber, and the method further comprises winding another unvulcanized rubber tape made of an air-impermeable rubber compound to make the inner liner rubber.

4. The method according to claim 1, wherein the tire further comprises:

an inner liner rubber disposed inside a carcass along the inner surface of the tire; and an insulation rubber disposed in a radially outer part of the sidewall portion between the carcass and the inner liner rubber, said at least one of the unvulcanized rubber components formed by winding said unvulcanized rubber tape, further includes the insulation rubber, the method further comprises winding another unvulcanized rubber tape made of an air-impermeable rubber compound to make the inner liner rubber.

5. The method according to claim 3 or 4, wherein said at least one of the unvulcanized rubber components formed by winding said unvulcanized rubber tape is made of a rubber compound including at least 2.5 parts by weight of an age resistor with respect to 100 parts by weight of rubber which includes 40 to 100 parts by weight of low viscosity polybutadiene rubber, and has a JIS type-A-durometer hardness of not more than 65 degrees and a 100% modulus of 0.5 to 2.5 MPa.

6. The method according to claim 1, 2, 3, or 4, wherein the tire further comprises a clinch rubber disposed in a bead portion of the tire along the axially outer surface and bottom face of the bead portion, the method further comprises winding an unvulcanized rubber tape to make the clinch rubber.

7. The method according to claim 1, wherein the axially outer sidewall rubber has a JIS type-A-durometer hardness of from 48 to 58 degrees, and a 230% modulus of from 1.5 to 6.0 MPa.

8. The method according to claim 1, wherein the unvulcanized fiber-reinforced rubber tape having the short fibers mixed therein has a thickness of 0.3 to 2.5 mm, the short fibers have an average length of 0.2 to 5 mm and an average diameter of 10 to 100 micrometers, the content of the short fibers in the rubber compound is 10 to 30 parts by weight with respect 100 parts by weight of the base rubber thereof.

9. The method according to claim 1, wherein the pneumatic tire has an aspect ratio of not more than 55%.

10. A method of manufacturing a pneumatic tire, comprising:

assembling tire components including a carcass and unvulcanized rubber components to make a green tire, the pneumatic tire comprising the carcass extending between bead portions through a tread portion and sidewall portions, an axially outer sidewall rubber disposed in each said sidewall portion to define an outer surface of the sidewall portion, and an axially inner sidewall rubber disposed on the axially inside of said axially outer sidewall rubber; and vulcanizing the green tire to form said pneumatic tire, wherein the method further comprises:

making said axially inner sidewall rubber by winding an unvulcanized rubber tape so that the windings collectively have a predetermined cross sectional shape of the axially inner sidewall rubber, wherein the unvulcanized rubber tape has short fibers mixed therein and the short fibers are oriented towards the longitudinal direction of the tape with a variable degree of orientation so that the degree of orientation of the fibers decreases at a middle of the sidewall portion, and making said axially outer sidewall rubber by winding another unvulcanized rubber tape so that the windings collectively have a predetermined cross sectional shape of the axially outer sidewall rubber.

11. The method according to claim 10, which further comprises changing said unvulcanized rubber tape with the short fibers therein in respect of said degree of orientation of the short fibers.

12. A method of manufacturing a pneumatic tire, comprising:

assembling tire components including a carcass and unvulcanized rubber components including a sidewall rubber to make a green tire, the pneumatic tire comprising the carcass extending between bead portions through a tread portion and sidewall portions, and the sidewall rubber disposed on the axially outside of the carcass in each said sidewall portion to define an outer surface of the sidewall portion; and vulcanizing the green tire to form said pneumatic tire, wherein the method further comprises:

making said sidewall rubber by winding an unvulcanized rubber tape so that the windings collectively have a predetermined cross sectional shape of the sidewall rubber, wherein the unvulcanized rubber tape has short fibers mixed therein and the short fibers are oriented towards the longitudinal direction of the tape with a variable degree of orientation so that, in the sidewall rubber, the degree of orientation of the fibers towards the tire circumferential direction decreases at a middle of the sidewall portion.

* * * * *